Patented Aug. 9, 1938

2,126,466

UNITED STATES PATENT OFFICE 2,126,466

MEDICINAL OLEAGINOUS DISTILLATION

Kenneth C. D. Hickman, Rochester, N. Y., assignor, by mesne assignments, to Eastman Kodak Company, Jersey City, N. J., a corporation of New Jersey No Drawing. Application August 24, 1935, Serial No. 37,750

9 Claims. (Cl. 87—12)

One of the objects of this invention is the preparation of an oleaginous compound, containing a relatively high percentage of unsaturated fatty glycerides, substantially free from fatty acids and products of incipient rancidity. Another object of the invention is the production of an oleaginous compound, containing a high percentage of unsaturated fatty glycerides and substantially free from protein-like substances, and containing only a small amount of unsaponifiable matter, particularly sterols.

A further and particular object of this invention is the production of a palatable and easily digestible oleaginous compound, that is readily absorbed from the intestines, and possesses beneficial properties in the treatment of eczematoid eruptions, resulting from the intolerance of certain food factors.

Other objects and purposes of this invention, not here set forth in detail, will become obvious to those skilled in the art as the description proceeds.

It is well known that some people display a marked intolerance toward certain seemingly essential foods, such intolerance manifesting itself by various symptoms, but most commonly as a skin rash or eczematoid eruptions. In many cases, such symptoms are accompanied by a considerable degree of discomfort, and further constitute an important hazard through the possibility of secondary infections of a serious nature.

As a general rule, proteins are the most common offending substances, the proteins of animal origin such as of beef, pork, mutton, and even such seemingly essential protein bodies as those contained in eggs and milk are known to give rise to allergic conditions. There are also a vast variety of vegetable proteins that are responsible for food allergies; thus, the problem of determining the specific offending substances is frequently of such magnitude as to defy the more common skin contact method of diagnosis.

In addition, there are a variety of non-specific and idiopathic food allergies, which manifest themselves as skin eruptions, that so far have defied all efforts of identification of the causative factor. It would be out of place here to attempt a consideration of the innumerable theories as to the etiology of food allergies, suffice it to say that it is the general consensus of opinion that the condition arises through the inability, on the part of the system, to utilize the factor or factors giving rise to the syndrome of symptoms, hence they remain "undigested", so to speak, in the blood, and act as toxins, and the symptomic conditions arise as a result of this apparent intoxication.

The so-called non-specific and idiopathic food allergies may not, in fact, be such at all, but simply cases wherein the causative factor is so remote as to make it practically impossible to detect it by the skin contact test. Again, it may be that some protein fraction in the causative factor is responsible, and this fraction may occur in a widely different variety of foods, so that the condition appears to be non-specific, with respect to a single food. Exclusion of a specific food in such cases may be impossible, or at least exceedingly difficult.

Now it has been discovered that certain oils and oleaginous compounds apparently contain a principle that materially increases the individual tolerance of food factors that give rise to allergic symptoms, so that in the presence of a sufficient quantity of these compounds in the diet, foods ordinarily causing allergic manifestations may be tolerated without causing such symptoms to arise. Just how these compounds act in this respect cannot be stated with any degree of certainty at this time, nor is it possible to state the exact constituent that is responsible for their action. It has been observed, however, that oils and oleaginous compounds containing a high percentage of unsaturated fatty glycerides are most potent in this effect.

It has been discovered that feeding of unsaturated fatty glycerides to dogs greatly increases the iodine number of the blood fats, or, in other words, the concentration of blood fat is shifted in favor of the unsaturated fatty glycerides, and there is a further increase in the blood lipins and cholesterol.

It is well known that unsaturated fats are more readily metabolized or utilized by the cells of the body, hence are not as likely to be laid down in the fatty depots, unless taken in considerable excess, and it is possible that some relation may be obtained whereby the unsplit or unutilized protein, which gives rise to the allergic condition, is acted on either by the unsaturated fat, per se, or becomes involved in the oxidation or utilization of the unsaturated fat, and thus may be split, or made available to the cells, and thus remove it as a toxic factor from the blood. On the other hand, the unsaturated fats, or some factor accompanying them, may function in some way to produce the more ready excretion of the offending factor from the blood, either by way of the liver or kidneys, and thus avoid conditions of allergy.

Such considerations as are here given are essentially inconclusive, since my own research work has not yielded data of a nature that would permit drawing conclusions as to the exact mechanism involved in this ameliorating effect of oleaginous compounds on allergy producing food factors.

In order to derive the above mentioned benefits from the feeding of unsaturated oleaginous materials it is essential that the materials be employed in a highly purified state. The degree of purity required cannot be attained by methods commonly employed in refining oleaginous materials.

In the first place, it is necessary to administer high levels of the fat, and in order that no untoward effect result from the fat, per se, it is essential that it be exceedingly free from products of rancidity and free fatty acids. Incipiently rancid fats, if taken consistently, cause internal irritations that may give rise to serious consequences. It has also been found that for the best results the fat should be as nearly as possible protein-free. All fats as obtained from natural sources contain some free fatty acids, due to hydrolysis either from moisture occurring naturally with the fat, or due to the means of extraction or expression. It is common practice in the refining of oils to remove the fatty acids by saponification or washing with alkaline solutions, but this introduces some moisture in the oil, due to the mutual solubility existing between oil and water. The presence of even traces of moisture in the oil militates against the good keeping qualities of the oil during subsequent storage. The removal of naturally occurring protein bodies from a fat or oil, with which the oil readily becomes contaminated during the expression operation, through the inclusion of minor quantities of seed husks and meat, etc. offers a very difficult problem, unless the process which I here disclose is employed.

I also contemplate the concentration of the unsaturated fatty glycerides in certain oleaginous compounds, by the process of distillation here disclosed. For instance, linseed and similar oils may be thus treated so as to remove a large percentage of its contained solid fatty acid glycerides and triolein, so that the concentrated product consists substantially of trilinoleate and trilinoleniate.

Having outlined the objects of this invention, and set forth the character of the composition of matter disclosed, together with its value and practical use in the art, I shall now proceed to describe the method comprehended by this invention for the production of such composition of matter.

Any suitable oil containing a high percentage of unsaturated fatty glycerides, such as perilla, linseed, n'gart oil, walnut, poppy seed, soya bean, sunflower, candle nut, corn, cottonseed, salmon, cod-liver, sardine, menhaden, etc., may be employed and processed by a method of molecular distillation, wherein it is preferred, for reasons hereinafter stated, but not essential to the ultimate object of our invention, to first treat the oil by bubbling through it a stream of heated hydrogen, the purpose of which is to sweep out air and other gases contained in the oil, replacing them with hydrogen.

After this pretreatment of the oil, it is led into a degassing apparatus, which consists substantially of a chamber or chambers through which the oil passes into a thin film, and in contact with surfaces heated so as to cause the oil to obtain a temperature of approximately 100° C. The chamber or chambers are subject to evacuation by the use of a suitable vacuum pump so that the gas pressure within the chamber, during the passage of the oil, is reduced to and maintained at about 10 mm. of mercury absolute pressure. This treatment suffices to remove substantially all of the dissolved and/or occluded gases contained in the oil, and with such oils as linseed further serves to remove a considerable quantity of the substances responsible for the taste of the oil. I have also found it desirable to divide the degasser into two separate compartments, through which the oil passes in series, and in the first compartment to carry a lower temperature of the oil and a higher gas pressure, while in the second compartment a higher temperature is provided with a lower gas pressure.

From the degassing apparatus, the oil is conducted in closed pipes or tubes to a molecular distilling apparatus, substantially as described by my U. S. Patents Nos. 1,925,559 and 1,942,858.

By molecular distillation as used in the specification and claims I intend to designate that type of distillation which has become known in the art by that name or by the name of evaporative distillation. See for example Hickman Patents 1,925,559 and 1,942,858, Burch 1,955,321, Washburn "Bureau St. Jour. Res." vol. 2 (1929) pp. 477–483 and Carothers "Jour. Am. Chem. Soc." vol. 54 (1932).

Processes of molecular distillation are those which are carried out under such a low pressure that the residual gas molecules do not substantially interfere with the passage of the distilling molecules from the evaporating to the condensing surface, the surfaces being separated by a distance of preferably not greater than the mean free path of the molecules of residual gas. Pressures of below .1 mm. may be used, but lower pressures, such as below .01 mm. and preferably about .001 to .0001 mm. are most satisfactory for molecular distillation. The lowest pressures attainable give best results, but as such low pressures are expensive and difficult to maintain, they are not generally employed. The distance separating the evaporating and condensing surfaces can be increased with decrease in pressure since the mean free path is practically inversely proportional to the pressure. Thus with a pressure of .001 mm. it is well to have the surfaces within 1" or 2" of each other; with a pressure of .0001 mm. surfaces may be 10 times this distance and so pro rata.

It is obvious that under the conditions obtaining in a molecular still, water vapor is effectively removed, since it would not be condensible under the conditions obtaining during the distillation. It is further obvious that the process involves the use of no reagents that would leave undesirable residues or by-products, the process being entirely physical.

With respect to the pretreatment with hydrogen, this, as previously pointed out, is not essential to the ultimate object of the invention, but serves to facilitate the holding of the required degree of vacuum within the still, since it quite effectively displaces gases of heavy molecular weight occurring in the crude oil, and due to the light weight of hydrogen it is more readily pumped out under conditions of high vacua.

The free fatty acids and sterols, collect as a distillate from the first stage of the still, and will vary in amount with the condition of the original oil. The fractions collected from subsequent stages constitute a highly purified oil for use in the treatment of allergic conditions of the skin, due to certain food intolerance. The residue from the still may be either put to any desirable use or rejected. A typical example of the fractions obtained, together with their character, from linseed oil, is given:

Linseed oil

|  | Original | 1 | 2 | 3 | 4 | Residue |
|---|---|---|---|---|---|---|
| Iodine No. | 187.9 | 148.7 | 148.0 | 173.3 | 177.9 | 190 |
| Saponification No. | 192.5 | 171.3 | 163.1 | 183.3 | 194.2 | 184.1 |
| Non-saponifiable matter | 1.36 | 16.14 | 2.67 | 0.93 | 0.56 | 0.93 |
| Free fatty acids as oleic acid | 1.6 | 36.8 | 0.8 | 0.25 | 0.25 | 0.37 |
| Unsaturated fatty acids | 85.57 | 69.45 | 86.11 | 88.11 | 88.04 | 88.6 |

In the use of my distilled oil therapeutically, it may also be desirable, where subjects display a poor fat absorption, to add a small percentage of highly purified lecithin to the oil to promote absorption or digestion of the fat. The oil may also be emulsified with any suitable inert phase for the purpose of increasing the surface of the oil, as taken into the system, and thus promote better absorption from intestines. While the oil so produced is surprisingly free from taste and odor, it may be desirable, for the sake of improving palatability, to add any desirable flavor, such as essential oils, methyl salicylate, etc., in very small quantities.

When oils containing fat soluble vitamins, such as various fish oils, are distilled the conditions of operation can be varied to give either a distillate containing the vitamins dissolved in the bulk of the purified oil or the oil and vitamin containing fraction can be collected separately and mixed in any desired proportions. The vitamin concentrates may, of course, also be added to the purified distillates from oils containing no vitamins.

Clinical evidence indicates that the fat soluble vitamin A plays an important role in disorders of the skin, and that the fat soluble vitamin D is also indicated in such disorders, in addition to promoting the absorption of fats from the intestines. In this way, a synergetic relationship exists between the fat soluble vitamins and oleaginous compounds for treatment of the skin, that greatly enhances their value.

The expression "high vacuum short path" distillation as used in the claims is to be accorded its usual meaning in the distillation arts, namely, a process of distillation wherein the vaporizing and condensing surfaces are separated by a short distance and a high vacuum is maintained therebetween.

What I claim is:

1. The process which comprises subjecting a highly unsaturated vegetable oil to distillation under high vacuum short path conditions and separating a distillate containing the unsaturated glyceride content thereof free of protein material and objectionable odor.

2. The process which comprises subjecting a highly unsaturated animal oil to high vacuum-short path distillation for a period of time sufficient to vaporize the unsaturated glyceride content thereof and separating a fraction containing mostly unsaturated glyceride.

3. The process which comprises subjecting a drying oil to high vacuum-short path distillation and separating a distillate containing the unsaturated glyceride content thereof free of objectionable materials and odors.

4. The process which comprises subjecting an oleaginous material having a high content of unsaturated glycerides to molecular distillation for a period of time sufficient to vaporize the unsaturated glyceride content thereof and separating a fraction containing mostly unsaturated glycerides.

5. The process which comprises subjecting a drying oil to molecular distillation and separating a distillate containing as the main constituent unsaturated glycerides substantially free of non-volatile residues and protein matter.

6. The process which comprises subjecting linseed oil to molecular distillation and separating a distillate containing as the main constituent unsaturated glycerides of medicinal value.

7. The process which comprises subjecting a highly unsaturated animal or vegetable oil to molecular distillation and separating a plurality of fractions, the first fraction separated being the free fatty acids and other more volatile components of the oil and a higher temperature fraction which is substantially more unsaturated than the original oil being predominantly the highly unsaturated glyceride content of the original oil.

8. The process which comprises subjecting a drying oil to high vacuum-short path distillation and separating a plurality of fractions, the first fraction separated being the free fatty acids and other more volatile components of the oil and a higher temperature fraction being predominantly the highly unsaturated glyceride content of the original oil.

9. The process which comprises subjecting a drying oil to molecular distillation and separating a plurality of fractions, the first fraction separated being one which contains most of the free fatty acids and volatile components of the oil and a higher temperature fraction being one which consists primarily of the highly unsaturated glycerides contained in the original oil.

KENNETH C. D. HICKMAN.

CERTIFICATE OF CORRECTION.

Patent No. 2,126,466.     August 9, 1938.

KENNETH C. D. HICKMAN.

It is hereby certified that error appears in the printed specification of the above numbered patent requiring correction as follows: Page 3, first column, line 15, in the table, under the heading "Original" for "187.9" read 177.9; and in the next to the last column, same line, for "177.9" read 187.9; and that the said Letters Patent should be read with this correction therein that the same may conform to the record of the case in the Patent Office.

Signed and sealed this 13th day of September, A. D. 1938.

Henry Van Arsdale (Seal)     Acting Commissioner of Patents.